(12) United States Patent
Bergmann

(10) Patent No.: US 6,294,098 B1
(45) Date of Patent: Sep. 25, 2001

(54) HIGH EFFICIENCY BACKWASH SHOE

(75) Inventor: Eugen O. Bergmann, St. George, UT (US)

(73) Assignee: Aqua-Aerobics System, Inc., Rockford, IL (US)

( * ) Notice: Subject to any disclaimer, the term of this patent is extended or adjusted under 35 U.S.C. 154(b) by 0 days.

(21) Appl. No.: 09/576,699

(22) Filed: May 23, 2000

(51) Int. Cl.[7] .................................................. B01D 33/50
(52) U.S. Cl. .................... 210/791; 210/331; 210/333.01; 210/392; 210/406; 210/411
(58) Field of Search .................................. 210/780, 784, 210/791, 330, 331, 391, 407, 333.01, 392, 393, 406, 411, 798

(56) References Cited

U.S. PATENT DOCUMENTS

| | | | |
|---|---|---|---|
| 4,090,965 | 5/1978 | Fuchs | 210/402 |
| 4,639,315 | 1/1987 | Fuchs et al. | 210/427 |
| 5,855,799 | * 1/1999 | Herrmann | 210/331 |
| 5,951,878 | * 9/1999 | Astrom | 210/331 |
| 6,090,298 | * 7/2000 | Weis | 210/331 |
| 6,103,132 | * 8/2000 | Seyfried et al. | 210/331 |

* cited by examiner

Primary Examiner—Robert J. Popovics
(74) Attorney, Agent, or Firm—Niro, Scavone, Haller & Niro

(57) ABSTRACT

In an apparatus containing rotating filter media that removes solids from a fluid stream, the invention provides devices and methods for improved cleaning of the filter media. Solids trapped on the filter media are removed by the application of a suction pressure that draws the filter media into contact with a backwash shoe. The backwash shoe has one or more orifice slots in a radially tapered or oblique angular configuration or in a combination of radially tapered and oblique angular configurations. The orifice slot configuration creates an hydraulic condition where the unit of orifice area applied per unit filter area has a generally uniform ratio across the rotating filter media. This configuration equalizes the distribution of the backwash flow over the filter area, thereby maintaining the filter media in a more uniformly clean and effective filtering condition.

9 Claims, 4 Drawing Sheets

HIGH EFFICIENCY BACKWASH SHOE

FIELD OF THE INVENTION

The present invention applies generally to a filter apparatus for removing suspended solids from a fluid stream that is passed through filter media. More particularly, the present invention relates to methods and apparatus for cleaning the filter media.

BACKGROUND OF THE INVENTION

The inventions claimed relate generally to the cleaning of rotating filter media commonly employed in the treatment of fluids such as water, wastewater and industrial process streams. Such filters often employ textile cloth membranes of cellulose base material, other natural fibers or synthetic fibers of a specific diameter, length or cross section shape woven or napped into a tight, single layer or multiple layer fabric or matting to obtain a desired thickness and porosity. Such fibers may be needle napped to a textile support grid of the same or different materials. Such support grid is to provide lateral strength to the fabric. The fibers may also be woven into a dense cut pile fabric supported by an open weave textile support grid. The cloth filter media is stretched over large drums or multiple disk-type frames. For non-limiting examples, see U.S. Pat. Nos. 4,090,965 and 4,639,315.

Typically, the filter media is placed in the flow path of a fluid stream containing suspended solid particles which are to be removed by the filtering process. The solid particles larger than the openings in the filter media are retained on the upstream, or influent, side of the filter media while the remaining flow (the filter effluent) passes through. Over time, these solids build up into a dense film on the influent side of the filter media and impede the rate of filter effluent that passes through, thus necessitating a cleaning of the filter to remove the solids build-up. One common cleaning method known in the art is reverse flow backwashing.

Backwashing is a process whereby a small portion of the flow through the filter is momentarily reversed to slough off the concentrated surface solids and transport them to a backwash water reprocessing station. With modern filtering mechanisms of this kind, backwashing can be accomplished without taking the filter out of service or off-line.

A stationary backwash collection header or a so called "backwash shoe" is located radially against the filter media surface. On the contact side against the media there is a non-abrasive slotted orifice plate mounted to the backwash shoe. The orifice plate and the shoe are held in contact with the media by a spring loaded actuator. To avoid influent leakage into the shoe an effective orifice plate alignment has to be maintained. Leakage at this point can result in diminishing cleaning potential.

The backwash collection header (or shoe) is connected to a suction pump which actuates the backwash flow when a headloss or time set point is reached during the filtration process. During this backwash operation, the disks are rotating and the entire media surface passes across the slotted orifice openings on the stationary backwash shoe at least one time. Due to backwash fluid suction and solids mat resistance, the cloth media is partially drawn into the orifice slot and is induced to flexure which aids in separating the surface solids from the media while the back flushing is in progress. The orifice slot has certain upper and lower width limits. An orifice slot that is too small will prevent adequate backwash flow and cause possible severe bridging of solids. An orifice slot that is too wide will cause excessive "draw-in" into the orifice slot of the filter media and will tend to stretch it. Heavy "draw-in" will also increase the material wear and the drive motor power demand.

The effectiveness of the cleaning process depends on the application of a sufficient and uniformly distributed backwash flow volume through the orifice slots. Ideally the application of the backwash flow would be evenly distributed across the filter media, but inherent limitations in the current mechanical design of backwash shoes and their orientation prevent known systems from functioning in this optimized condition. Moreover, it is desirable to minimize the length and frequency of filter cleaning cycles. Consequently, a cleaning process that cleans unevenly or fails to effectively remove the collected surface solids will require more frequent cleaning and will produce less filter effluent.

It is a known problem with current methods of rotating disk filter media cleaning that the area of the rotating filter media nearest the axis of rotation is cleaned more thoroughly than the more radially distant areas. This is primarily due to the common use of a single, fixed-width orifice slot running the length of the backwash shoe. This arrangement creates a substantially higher applied backwash flow per unit of filter area at the inner portion of the rotating filter media in the prior art. It is also a known problem that uneven cleaning of rotating disk filter media reduces the rate of production of filtered effluent and increases the frequency of backwash cycles. The present inventions provide improved cleaning methods and structures that overcome these and other limitations of current backwash cleaning techniques.

A significant advantage of the present invention over prior art methods and devices for cleaning filter media is that the method and apparatus of the invention maintains the filter media in a uniformly clean, and thus, more effective filtering condition for longer periods of filter operation. This advantage results because the backwash flow rate per unit of filter area is distributed more evenly across the filter media compared to prior art filter cleaning devices and methods. The invention significantly reduces the number of wash cycles required by the filter and, thus, highly efficient filtration is achieved.

It is also a feature and advantage of the present invention to improve media cleaning performance and increase filtered water production and reduce required energy, washwater consumption, waste washwater volume and overall cost.

DEFINITION OF TERMS

The following terms are used in the claims of the patent and are intended to have their broadest meaning consistent with the requirements of law:

orifice slot—an opening in a backwash shoe.

backwash shoe—any conduit for transmitting suction pressure to an orifice slot or a plurality of orifice slots.

filter media—any permeable material, including but not limited to natural or synthetic fiber based, granular or membrane compositions;

concentric band—a generally circular geometric strip having a width of a radial distance;

radial distance—a length measured along a straight line which intersects the center of a rotating filter element; and Where alternative meanings are possible, the broadest meaning is intended. All words in the claims are intended to be used in the normal, customary usage of grammar and the English language.

BRIEF DESCRIPTION OF THE DRAWINGS

FIG. 1A is a lateral view of the filter of FIG. 1.

DETAILED DESCRIPTION OF THE PREFERRED EMBODIMENT

Set forth below is a description of what is currently believed to be the preferred embodiment or best example of the invention. Future and present alternatives and modifications to this preferred embodiment are contemplated. Any alternatives or modifications which make insubstantial changes in function, in purpose, in structure or in result are intended to be covered by the claims of this patent.

Figure 1:
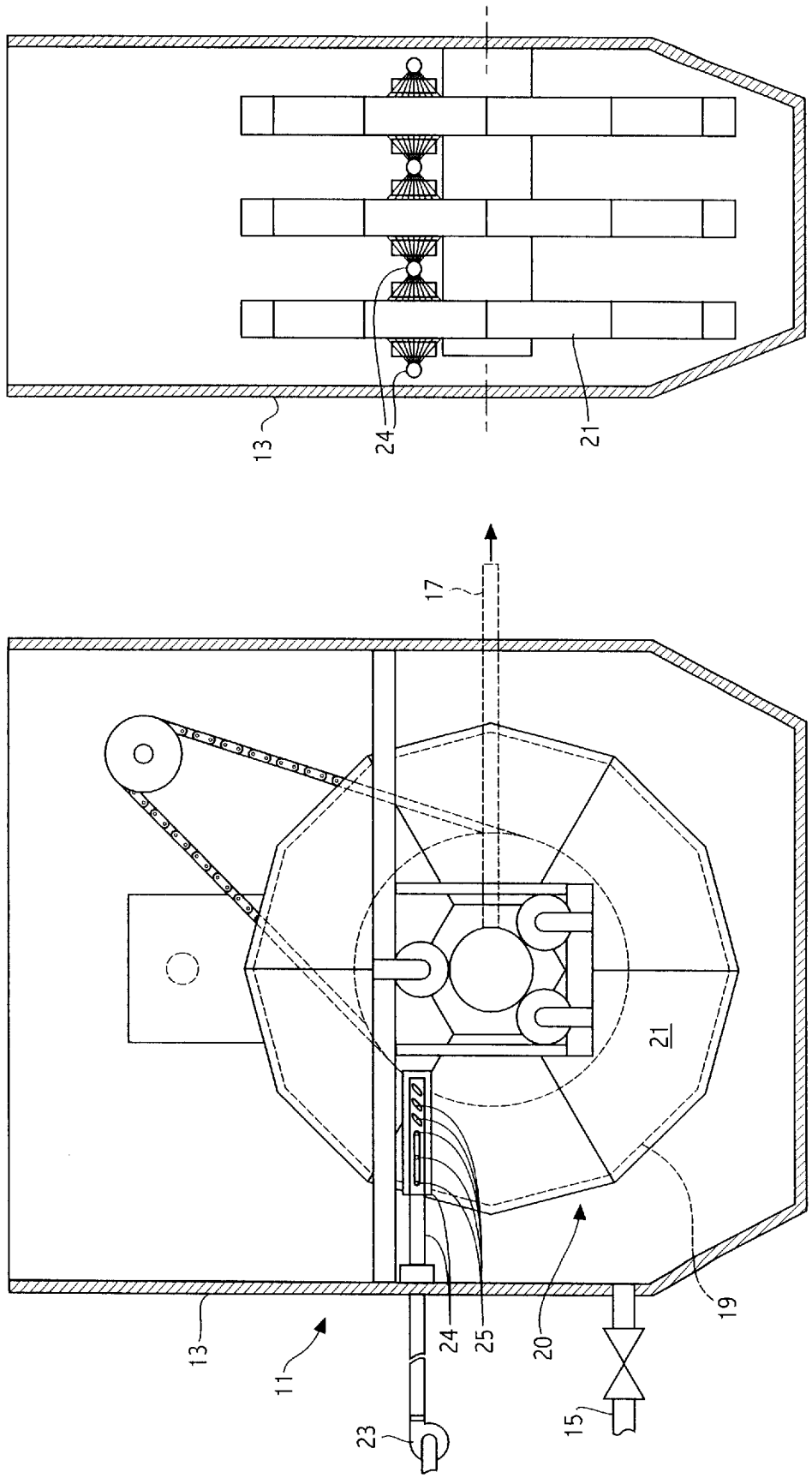
FIG. 1 is a diagrammatic vertical sectional view through a typical rotating disk filter apparatus, with parts broken away to illustrate details of construction.

FIGS. 1 AND 1A depict a filter apparatus 11 that applies the principles of the present invention to a known device. The filter apparatus 11 is particularly applicable to water and wastewater treatment. The filter apparatus 11 includes a filter tank 13 having an influent inlet 15 and an effluent outlet 17, hollow filter frames 19 disposed between the influent inlet 15 and the effluent outlet 17, rotating filter 20 and filter media 21 supported by each filter frame 19. In alternative embodiments, the filter apparatus 11 may include additional filter frames 19 or a single filter frame 19. In addition, filtering may occur from the outside of the frames 19 into the center or in the reverse direction.

The filter apparatus 11 incorporates a media cleaning system that includes a backwash assembly that is operable to draw a volume of filtrate (a backwash) through the filter media 21 in the opposite direction of flow of the normal filter operation. When operated, one or more backwash shoes 24, positioned in communication with the upstream side or influent of the filter media 21, are drawn into contact with the filter media 21 by a spring actuator (not shown) and by the operation of a pump 23 applying suction pressure on the shoe 24 to develop a fluid seal between influent and effluent sections. The suction pressure draws effluent and a portion of the filter media 21 into the backwash shoe 24 through an orifice slot 25. The combination of the reverse filtrate flow and the flexure action of the media across the orifice slots work to dislodge accumulated solids from the filter media 21.

The problems of the prior art backwash cleaning methods arise from the uneven distribution of backwash flow per unit of filter media 21. The use of a single fixed width orifice slot 25 positioned lengthwise on the backwash shoe 24 (see FIG. 3) results in greater backwash per unit of filter media 21 on the inner portion of the rotating filter 20, thereby cleaning the inner portion of the filter media 21 to a greater degree than the outer portion.

Figure 2:
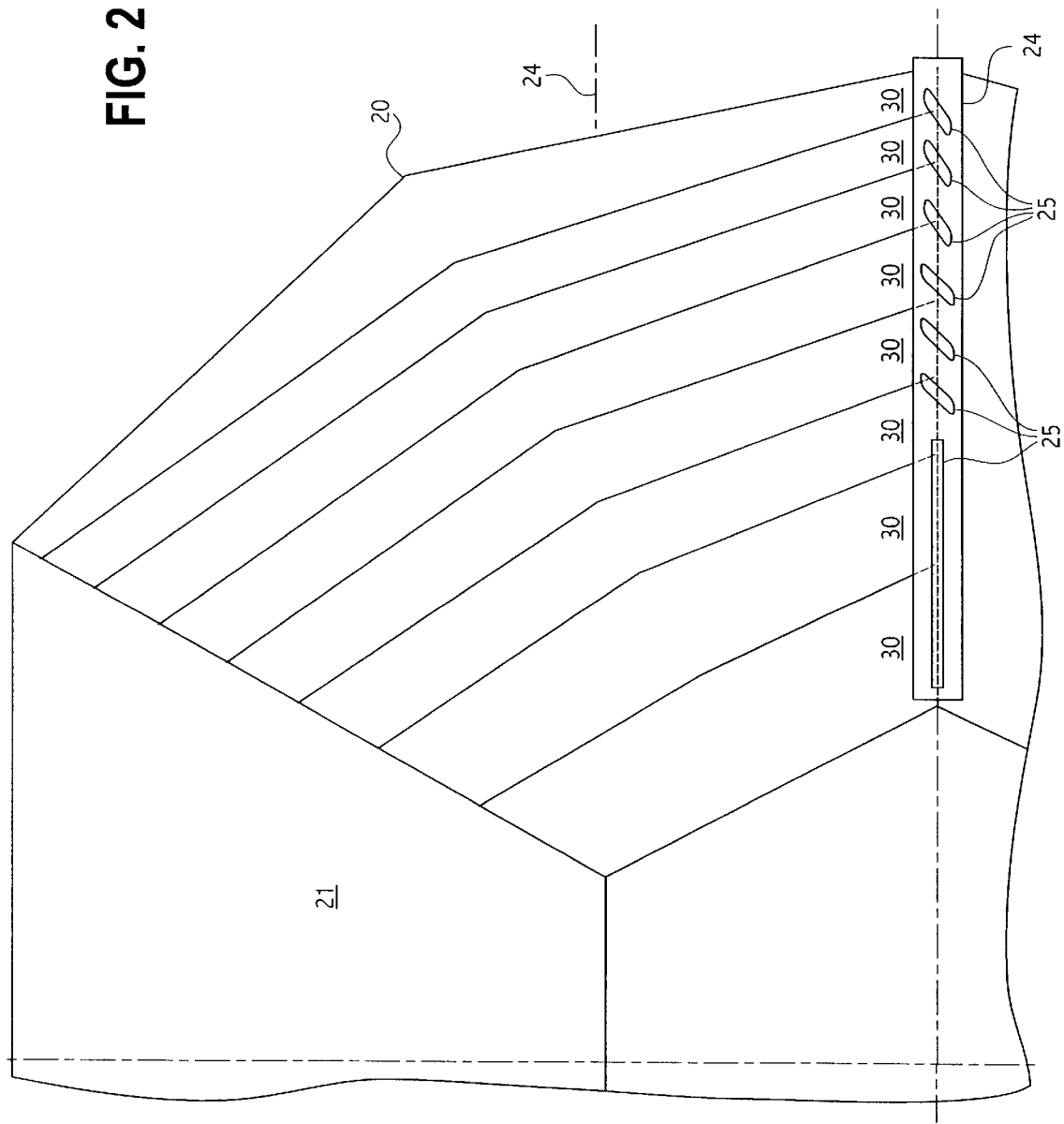
FIG. 2 is a diagrammatic view of a filter media showing a geometric division of the filter media into concentric bands of generally equal surface area.

One solution to the backwash flow imbalance, illustrated generally in FIG. 2, involves dividing the operative filter area 21 into concentric bands 30 of equal surface area ($A_b$), the number of bands 30 corresponding to the desired number of cleaning zones (n). Since the concentric bands 30 have equal surface area in this example, they have a generally decreasing radial width from the innermost to the outermost band 30 to compensate for a generally increasing band circumference.

The selection of a desired number of cleaning zones is a matter of design preference. While any number of zones may be selected, the improvements in cleaning efficiency are achieved to a greater degree as the number of zones increases. Given a known number of bands 30 and a constant surface area per band, the diameter ($D_n$) and width ($b_n$) of any particular concentric band 30, can be determined by the following algorithms:

Eq. 1

$$\sum_{n=1}^{n\max} D_n = \left[\frac{A_2 + nA_b}{(\pi/4)}\right]^{\frac{1}{2}}$$

where:
$D_n$=the outside diameter of the nth concentric band;
$A_2$=inside disk area (non-filtering)
$A_b$=filtering area per zone Eq. 2

$$\sum_{n=1}^{n\max} b_n = \frac{D_n - D_i}{2}$$

where:
$b_n$=the width of the nth concentric band;
$D_i = D_{n-1}$=the inside diameter of the nth concentric band Orifice slots 25 of equal area per band are then configured and positioned on the backwash shoe 24 so as to at least span the width of each concentric band 30.

Figure 3:
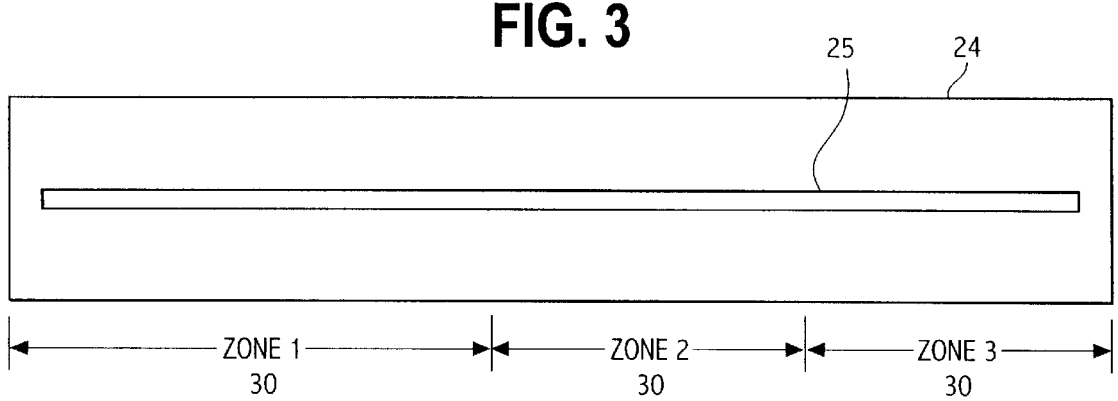
FIG. 3 is a diagrammatic view of a prior art backwash shoe with a single orifice slot of constant width.

Since the concentric bands 30 have equal surface area but decreasing width, a backwash shoe 24 having an orifice slot 25 with a fixed width (as shown in FIG. 3) cannot apply an equal backwash flow per unit of filter area across the filter media 21. A way to increase backwash flow as the orifice slot 25 extends outward from the center of the rotating filter media 21 is required for optimum performance and operation.

Figure 4:
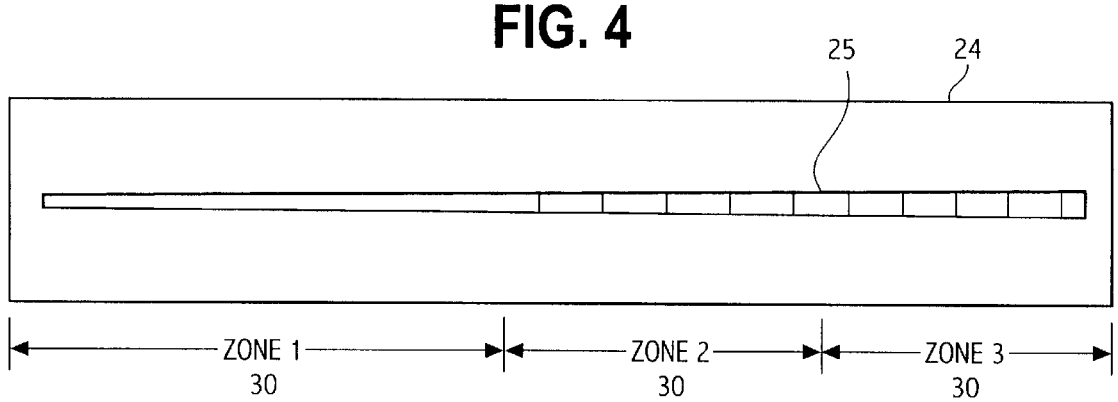
FIG. 4 is a diagrammatic view of a high efficiency backwash shoe with a single orifice slot of gradually increasing width.
Figure 5:
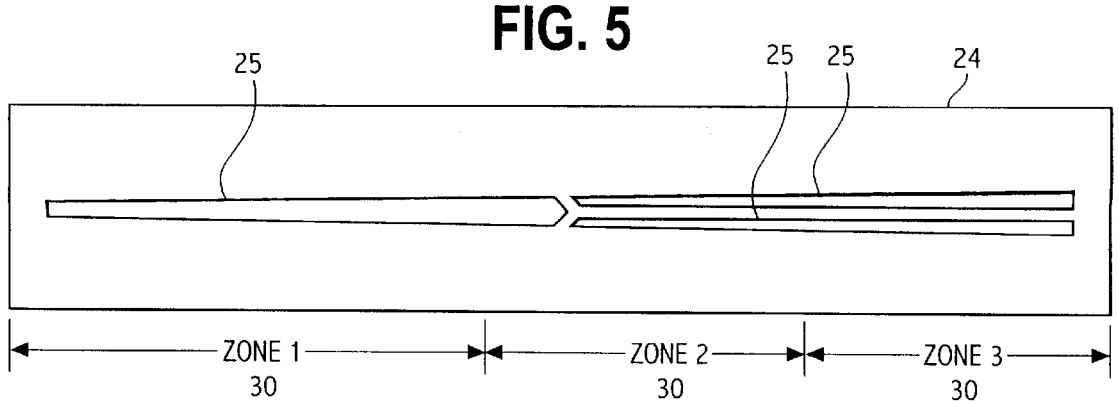
FIG. 5 is a diagrammatic view of a high efficiency backwash shoe with multiple orifice slots of gradually increasing width.

One unique way of solving the problem involves substituting a single tapered orifice slot 25 of gradually increasing width (as shown in FIG. 4) for the fixed width orifice slot 25 of FIG. 3. Since there are practical upper and lower limits to the width of an orifice slot 25 as described above and known to those of ordinary skill in the art, some implementations of the tapered orifice slot solution may require placing more than one orifice slot 25 on the backwash shoe 24. A preferred example of this alternative is shown in FIG. 5.

Figure 6:
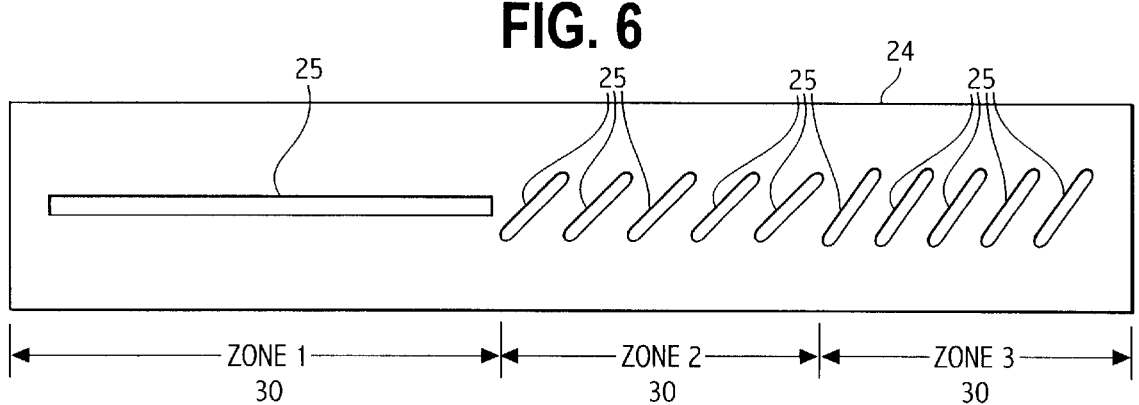
FIG. 6 is a diagrammatic view of a high efficiency backwash shoe with constant width orifice slots having equal length per cleaning zone.

An alternative to the tapered orifice slot solution is to employ fixed width orifice slots 25 of equal length per band 30 as shown in FIG. 6. Since the bands 30 have a decreasing width, the orientation of the orifice slots 25 must be at an angular rotation from the radial axis of the backwash shoe 24 in order to fit the required equal orifice slot length into the narrowing widths of the outer bands 30. The angle of rotation ($R_n$) for any orifice slot 25 in the $n^{th}$ band 30 is derived from the COS $b_n/L_n$, where $b_n$ is the radial width of the $n^{th}$ band 30; and $L_n$ is the length of an equal width orifice slot 25 for the selected "n" number of band segments. For assuring proper contact alignment the face width of the orifice plate must be held within certain limits. This limited width "w" will then determine the number of oblique orifice slots 25 ("$S_n$") per band width by the following mathematical function: $S_n \geq (L_n^2 - b_n^2)^{0.5}/w$. The angular slot arrangement shown in FIG. 6 is one example of how the same width equal length orifice slots 25 can be accommodated. The oblique slot arrangement necessitates a minor overlap with each adjacent orifice slot 25 at the leading and the trailing end to avoid certain dead band areas.

Figure 7:
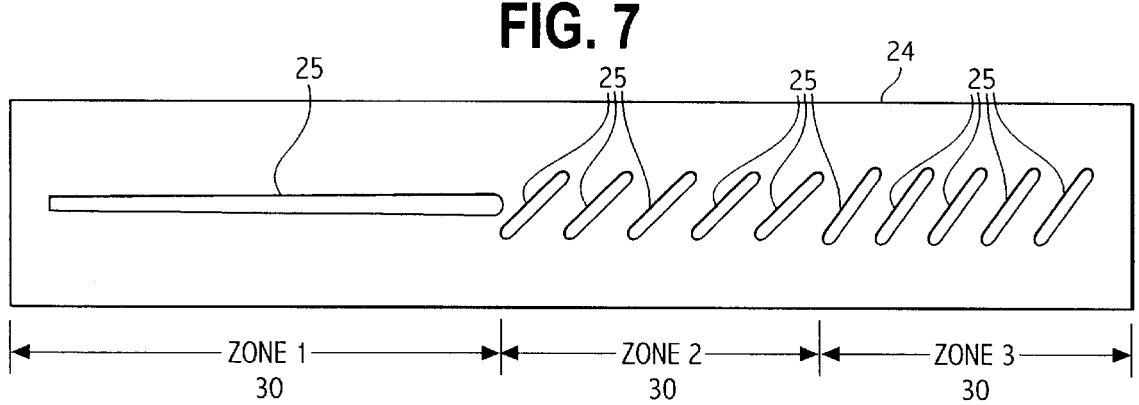
FIG. 7 is a diagrammatic view of a high efficiency backwash shoe with a combination of adjoining oblique orifice slots and a radial orifice slot of varying width.

The alternatives described above for equalizing backwash flow applied per unit area of the filter media 21 are complimentary and not exclusive. Therefore any combination of the above techniques can also be employed to achieve the desired result. A non-limiting example of a combination solution is shown in FIG. 7.

The orifice area is in the same proportion for all concentric bands 30, either by varying the orifice slot width, or length or both. Each of these bands 30 may be further divided into sub-bands 33 with orifice slots at different angular orientations. The orifice slot 25 for the innermost concentric band 30 may remain in the conventional straight line orientation. For the other concentric bands 30, one method for creating sub-bands divides the total orifice length into n slots 25 according to Equations 1 and 2.

Generally, the inventions described herein provide systems and methods for improving the efficiency of cleaning rotating filter media 21. The rotating media 21 is divided into concentric bands 30 of approximately equal surface area having decreasing width and increasing circumference from the innermost to the outermost bands 30. The bands 30 correspond to the desired number of cleaning zones. The backwash shoe 24 is conceptually divided into segments equal to the width of each band 30 and orifice slots 25 are positioned so that the orifice area applied to each band 30 is approximately equal. When operated according to the invention described herein, backwash flow is substantially equalized across the filter media 21. In this improved condition, the filter is maintained in a more uniformly clean and effective filtering condition for larger periods of time than conventional techniques.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims.

What is claimed is:

1. An apparatus for cleaning rotating filter media by backwash comprising:

at least one backwash shoe in fluid communication with a source of suction pressure;

at least one orifice slot positioned on said at least one backwash shoe, said slot defining an orifice area;

said at least one slot positioned on said at least one shoe such that a portion of said filter media is drawn into said slot when said suction pressure is applied to said shoe;

said at least one slot positioned on said at least one shoe such that the ratio of filter area cleaned per applied orifice area is substantially equal across said filter.

2. The apparatus of claim (1) further comprising:

said rotating filter comprising a plurality of generally concentric bands;

said at least one slot positioned on said shoe such that the ratio of said generally concentric band area cleaned per applied orifice area is substantially equal.

3. The apparatus of claim (1) further comprising:

said at least one slot positioned on said shoe such that said slot has a width that gradually increases from the inner filter area to the outer filter area.

4. The apparatus of claim (2) further comprising:

said at least one slot positioned on said shoe such that said slot has a generally constant width and a generally equal slot length in communication with each of said generally concentric bands.

5. A method for cleaning rotating filter media by backwash comprising the steps of:

dividing said rotating filter media into a plurality of generally concentric bands;

placing at least one backwash shoe in fluid communication with said rotating filter media, said backwash shoe having at least one orifice slot;

positioning said at least one orifice slot on said backwash shoe such that the ratio of orifice area to filter area is substantially equal for each of said concentric bands; and applying a force to said backwash shoe such that a portion of the filter media passing said at least one orifice slot is drawn into said slot.

6. The method of claim (5), wherein the dividing step comprises a geometric division of said filter media into generally concentric bands of approximately equal surface area.

7. The method of claim (6), wherein said at least one orifice slot is positioned on said shoe such that said slot has a generally constant width and a generally equal slot length in communication with each of said generally concentric bands.

8. The method of claim (5), wherein said at least one orifice slot is positioned on said shoe such that said slot has a width that gradually increases from the inner filter area to the outer filter area.

9. An apparatus for cleaning rotating filter media by backwash comprising:

a backwash shoe in fluid communication with a source of suction pressure;

at least three orifice slots positioned on said shoe, said slots defining an orifice area;

said slots positioned on said shoe such that a portion of said filter media is drawn into said slots when said suction pressure is applied to said shoe;

said slots positioned on said shoe such that the ratio of filter area cleaned per applied orifice area is substantially equal across said filter;

said slots positioned on said shoe such that a first slot occupies an area extending outward from the inner portion of said rotating filter, and such that second and third slots, generally parallel to each other, extend outward from the outer limit of said first slot.

* * * * *